Dec. 8, 1925.
I. A. TREIMAN
1,564,382
CLAMP
Filed Aug. 14, 1924
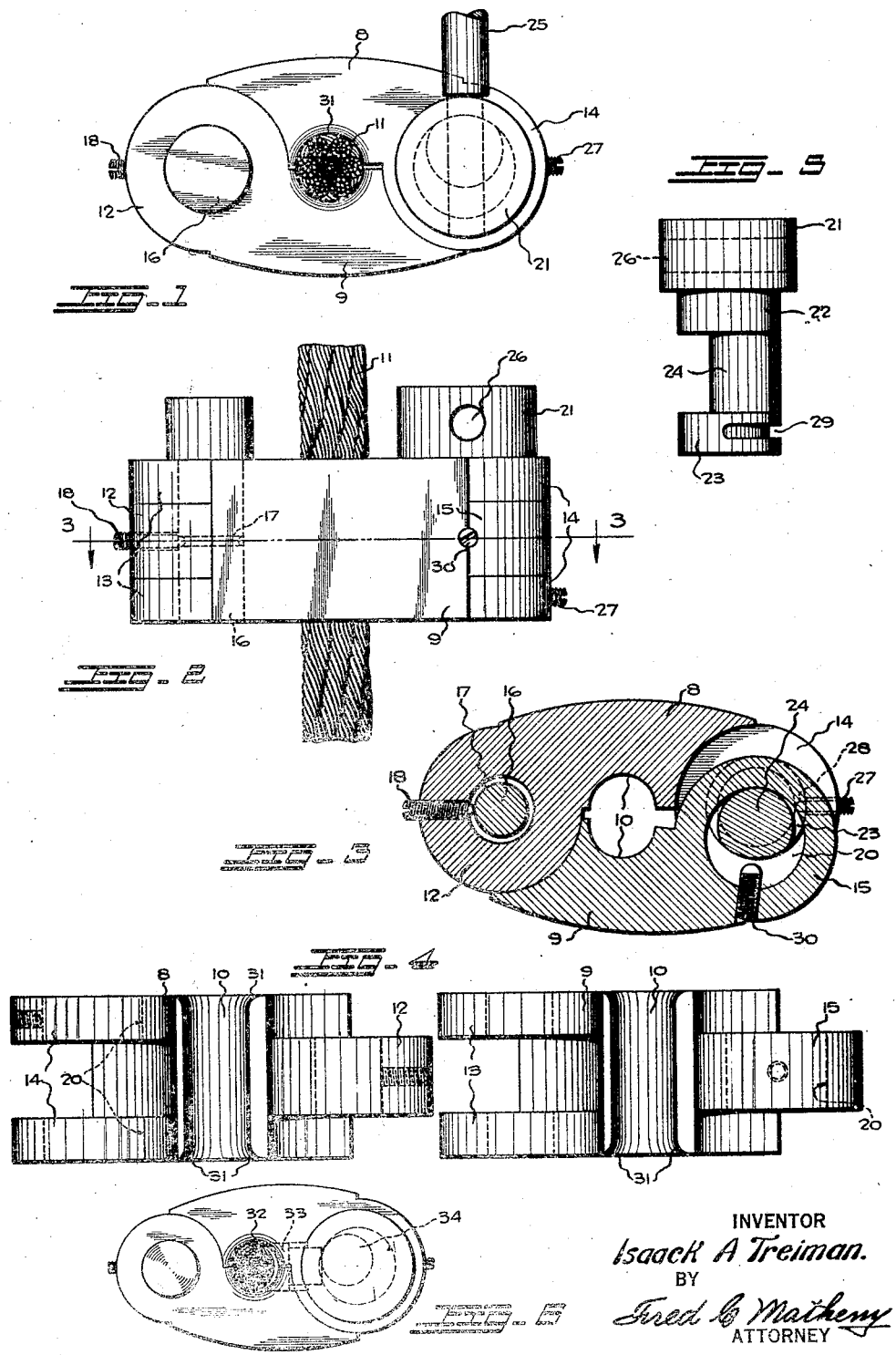
INVENTOR
Isaack A Treiman.
BY
Fred C Matheny
ATTORNEY Patented Dec. 8, 1925.

1,564,382

UNITED STATES PATENT OFFICE.

ISAACK A. TREIMAN, OF SEATTLE, WASHINGTON.

CLAMP.

Application filed August 14, 1924. Serial No. 731,942.

*To all whom it may concern:*

Be it known that I, ISAACK A. TREIMAN, a citizen of the United States, and a resident of Seattle, in the county of King and State of Washington, have invented certain new and useful Improvements in Clamps, of which the following is a specification.

My invention relates to improvements in clamps and the object of my improvement is to provide a clamp of strong and rugged construction that is adapted to be clamped tightly and immovably upon a cable without damaging the cable.

Another object is to provide a cable clamp embodying two clamping members pivotally connected at one end and adjustably connected at the other end by eccentric means that may be operated to tighten or loosen the clamp on a cable, said eccentric means serving to permanently hold the clamp in any tightened position on the cable.

Another object is to provide means for preventing endwise movement of the eccentric member and for limiting rotary movement of the same.

A further object is to provide a clamp formed of two parts connected at one end by an eccentric pin and at the other end by a pivot that may be readily removed to permit the two parts of the clamp to be opened up or spread apart so that they may be placed over a cable and closed thereon.

Other and more specific objects will be apparent from the following description taken in connection with the accompanying drawings.

In the drawings Figure 1 is a view in side elevation of a cable clamp constructed in accordance with my invention showing the same clamped on a cable.

Figure 2 is a plan view of the same.

Fig. 3 is a sectional view on broken line 3—3 of Fig. 2 showing the clamp detached from the cable and in an expanded or open position.

Fig. 4 is a plan view of the two clamp members detached from each other showing the inner or clamping sides of the same.

Fig. 5 is a detached view in elevation of an eccentric pin.

Fig. 6 is a view in elevation illustrating a modification of the invention.

In the use of large heavy cables of the type employed in logging operations it is often desirable to be able to place some obstructing device on a cable that will prevent a hook, or a loop of another cable, or a similar device from slipping thereon. For instance, in hauling in logs it is common practice to place choker lines on the logs, then hook onto these choker lines with a main line and haul the logs in. These choker lines are usually short pieces of cable with a hook on one end and a loop on the other, the choker line being adapted to be passed under and drawn around the log, the hook hooked over the choker line and a hook on the main cable hooked into the loop on the end of the choker line. When this is done it sometimes happens that temporary slackness in the cables while hauling in the logs will allow the hook on the choker line to become unhooked. My clamp is especially well adapted for use on choker lines of this form, the clamp being placed on the choker line and securely clamped thereon directly in front of the choker hook after the choker line has been drawn around the log as tightly as possible and the hook fastened, the clamp thus serving to prevent the hook from sliding forward on the choker line and loosening the hold on the log. It will be understood however that this is only one use for which my clamp is adapted and that the same is also adapted for many other uses.

Referring to the drawings, throughout which like reference numerals designate like parts, 8 and 9 designate two clamp members of oblong shape each provided substantially mid way between the two ends and on its inner side with a transverse groove 10 being arranged to register to form a circular opening through which a cable 11 may pass and within which said cable may be clamped when the members 8 and 9 are in clamping position.

The member 8 is provided at one end with an outwardly protruding lug 12 adapted to fit between two spaced lugs 13 on the member 9 and is provided at the other end with two spaced apart lugs 14 adapted for the reception therebetween of a single lug 15 on the other end of the member 9. The lugs on the ends of both clamping members 8 and 9 are preferably rounded substantially as shown.

A pivot pin 16 passes through suitable bores in the lugs 12 and 13 and is provided with an annular groove 17 within which the end of a locking screw 18 projects. The locking screw 18 may be readily retracted to permit removal of the pivot pin 16 and thus permit the two clamp members to be opened up or spread apart in placing the clamp on a cable.

The lugs 14 and 15 at the ends opposite pivot pin 16 are provided with relatively large bores 20 through which extends a clamping pin, Fig. 5, comprising a head 21, two larger cylindrical portions 22 and 23 for operating in the lugs 14 on member 8 and an intermediate eccentric portion 24 uniting the larger cylindrical portions 22 and 23 and arranged to operate in the lug 15 on member 9.

A pin 25 may be inserted through a hole 26 in the head 21 of the clamping pin for turning the same.

A screw 27 threaded into one of the lugs 14 and having an end 28 that projects into a semi-annular groove 29 in the clamping pin prevents withdrawal of the clamping pin and limits the rotary movement of said clamping pin to substantially one half of one complete turn.

A screw 30 that extends through one side of lug 15 and projects into the bore 20 thereof, is arranged to be engaged by the eccentric portion 24 of the clamping pin when said clamping pin is turned into the releasing position to thereby forcibly spread the clamping members apart.

The ends of the cable receiving grooves 12 are preferably rounded as at 31 to prevent damage to the cable. For some uses it may be desirable to make the clamping members 8 and 9 considerably wider than I have shown in the drawings and to round the same at the ends on a larger radius to thereby lessen the danger of damaging the cable by bending the same sharply. I also find it desirable in some instances to corrugate the walls of the cable receiving grooves 10 with spiral corrugations that will fit within the spiral grooves between adjacent strands of the cable thereby increasing the holding power of the clamps.

It will also be understood that if it is desired to do so an eccentric clamping pin may be provided at each end of the clamp instead of only at one end.

In operation it is sometimes possible in applying the clamp to a cable to expand the clamp and thrust the end of the cable through the grooves 10 but it will usually be necessary to loosen screw 18, remove pivot pin 16, spread the clamp members 8 and 9 apart insert the cable therebetween and then replace the pivot pin 16. The eccentric clamping pin must necessarily be unclamped or partially unclamped before the pivot pin 16 can be inserted or removed when a cable is in the clamp.

The clamp is tightened on a cable by inserting the operating bar 25 and turning the clamping pin until the eccentric portion of the same draws the two clamping members together tightly on the cable. After the clamp is tightened on a cable it will not loosen in ordinary use and can only be released by again inserting the operating bar and turning the clamping pin.

Fig. 1 illustrates the clamp in the maximum closed position and Fig. 3 shows the same in the maximum open position. In actual use the clamps, when tightened on a cable, will usually only be partly closed.

When the clamp is opened by turning the clamping pin, the eccentric portion 24 of the pin will strike against the screw 30 and forcibly open the clamp unless the clamp drops open before the eccentric portion 24 hits the pin 30.

In Fig. 6 I have shown a modified form of the invention which is similar to the previously described form except that, instead of moving the jaws toward and away from each other by an eccentric device as is done in the clamp shown in Figs. 1 to 5 inclusive the cable 32 is clamped by a plunger or pawl 33 slidable within the body of the clamp and moved against the cable by an eccentric device 24 similar to the clamping pin shown in Fig. 5.

This clamp is strong and simple in construction, not expensive to manufacture, easy to manipulate and capable of gripping a cable so tightly as to make it practically impossible to move the clamp on the cable.

The foregoing description and accompanying drawings clearly disclose a preferred embodiment of my invention but it will be understood that this disclosure is merely illustrative and that numerous changes may be made within the scope and spirit of the following claims.

I claim:

1. In a clamp of the class described, two clamping members pivotally connected at one end and having two clamping surfaces provided with registering grooves arranged to fit over a cable and eccentric clamping means at the other end of said clamping members for tightening said clamping members on an object and holding the same.

2. A clamp embodying two clamping members having interfitting lugs on both ends and having means for receiving a cable therebetween, a pivot pin extending through the interfitting lugs at one end of said clamping members and a clamping pin extending through the interfitting lugs of the clamping members at the other end, said clamping pin having an eccentric portion for drawing said two clamping members together when said clamping pin is turned.

3. A clamp embodying two clamp members having transversely grooved cable clamping means, pivot means connecting said clamp members at one end interfitting perforated lugs at the other end of said clamp members and a clamp pin extending through said interfitting lugs and having relatively eccentric portions operative in the lugs of the respective clamp members for drawing said clamp members together when it is rotated.

4. A clamp embodying two clamp members having transversely grooved cable clamping means, pivot means connecting said clamp members at one end, interfitting lugs at the other end of said clamp members said lugs all having transverse perforations of the same diameter arranged to register in the fully closed position of the clamp members, a clamping pin arranged to extend through said lugs, and having cylindrical portions adapted to fit snugly within the perforations in the lugs of one clamp member and an eccentric portion of smaller diameter than said cylindrical portion and tangent on one side thereto operatively disposed in the perforation of the end of the other clamp member and means for turning said clamping pin.

5. A clamp embodying two clamping members having transversely grooved cable clamping means, pivot means connecting said clamp members at one end, interfitting lugs at the other end of said clamp members said lugs all having transverse perforations of the same diameter arranged to register in the fully closed position of the clamp members, a clamping pin arranged to extend through said lugs, and having cylindrical portions adapted to fit snugly within the perforations in the lugs of one clamp member and an eccentric portion of smaller diameter than said cylindrical portions and tangent on one side thereto operatively disposed in the perforation of the lug of the other clamp member, means projecting into the perforation in the lug wherein said eccentric portion is disposed and arranged to be engaged by said eccentric portion to spread said clamp members apart, and means for turning said clamping pin.

6. A clamp embodying two clamping members each, having two spaced apart perforated lugs at one end and one centrally disposed perforated lug at the other end, the single lug on the end of each clamp member being arranged to fit between the two lugs on the end of the other clamp member, a readily removable pivot pin connecting said clamp members at one end and a clamping pin extending through the perforated lugs of the clamp members at the other end, the clamping pin having relatively eccentric portions operative in the lugs of the respective clamp members for drawing said clamp members together by rotation of said clamping pin.

The foregoing specification signed at Seattle, Wash., this 5th day of August, 1924.

ISAACK A. TREIMAN.